Nov. 19, 1968  D. SCARAMUCCI  3,411,746
WELDED BALL VALVE CONSTRUCTION
Filed June 30, 1966  3 Sheets-Sheet 1

INVENTOR.
DOMER SCARAMUCCI
BY
Dunlap and Honey
ATTORNEYS

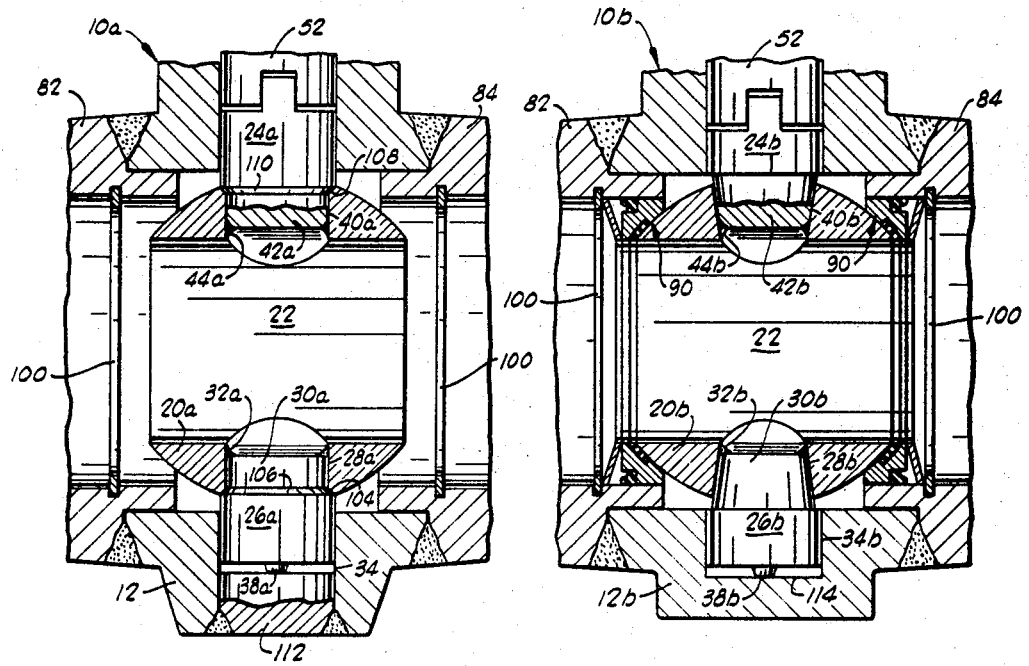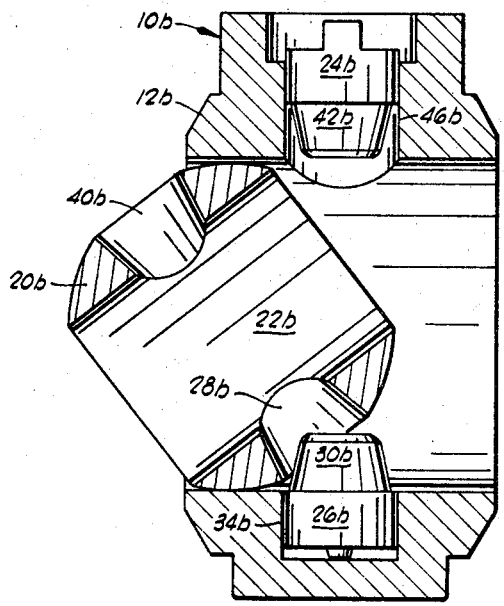

Nov. 19, 1968  D. SCARAMUCCI  3,411,746
WELDED BALL VALVE CONSTRUCTION
Filed June 30, 1966  3 Sheets-Sheet 3

INVENTOR.
DOMER SCARAMUCCI
BY
Dunlap and Laney
ATTORNEYS

United States Patent Office 3,411,746
Patented Nov. 19, 1968

3,411,746
WELDED BALL VALVE CONSTRUCTION
Domer Scaramucci, Oklahoma City, Okla., assignor to Balon Corporation, Oklahoma City, Okla., a corporation of Oklahoma
Filed June 30, 1966, Ser. No. 561,917
20 Claims. (Cl. 251—315)

This invention relates generally to improvements in ball valves, and more particularly, but not by way of limitation, to an improved ball valve of welded construction.

As it is well known in the ball valve art, some service conditions require the valve housings to be of welded construction, as well as being welded into the piping system. A typical service condition requiring such structure is when the valve is controlling the flow of high pressure steam.

A welded ball valve housing normally includes a valve body containing the valve chamber and connectors welded to the opposite ends of the valve body. Since the valve ball and, normally, the valve seats, must be in place when the connectors are welded to the opposite ends of the body, appreciable difficulty has been encountered in preventing distortion or damage of the valve parts when the connectors are welded to the valve body, as well as when the connectors are later welded into a piping system. It has been known to construct valve seats in such a manner that they may be installed after the connectors are welded to the valve body, but there still remains the problem of damaging the seats when the connectors are later welded into the piping system.

It is also highly desirable in some types of service conditions to mount the valve ball on trunnions to maintain the ball on a fixed vertical axis in all operating positions. Previous methods of mounting the valve ball on trunnions have required an excessive number of parts and have involved an undue period of time for the mounting of the ball on the trunnions to provide a resulting construction wherein the ball is freely turned between its open and closed positions.

In one aspect, the present invention contemplates a ball valve construction wherein the valve ball is provided with bores in the top and bottom thereof communicating with the flow port through the ball to receive the inner end portions of trunnions journaled in the valve body. The ball is secured to the trunnions by welding which is accomplished from the flow port, such that the ball is rigidly secured on the trunnions without disturbing the efficiency of the journaling type of support of the trunnions in the valve body.

In another aspect, the present invention contemplates a welded ball valve construction wherein the connector or connectors welded to the valve body are provided with heat radiating fins to minimize the transfer of heat to the valve parts during welding of the valve in a piping system and thus minimize the possibility of damage to the valve during this welding operation.

An object of the invention is to provide a trunnion-mounted valve ball wherein the ball is positively secured to the trunnions.

Another object of the invention is to provide a trunnion-mounted valve ball which may be accurately indexed to open and closed positions, even after extended service.

A further object of this invention is to provide a welded ball valve construction wherein the valve parts will not be damaged or distorted either during the construction of the valve or during the subsequent welding of the valve in a piping system.

A still further object of this invention is to provide an economically constructed ball valve particularly suited for high pressure and high temperature service and which will have a long service life.

Another object of this invention is to provide a method of constructing a ball valve which requires a minimum of parts to provide a completed valve and which requires a minimum of time for manufacture of the valve.

Other objects and advantages of the invention will be evident from the following detailed description when read in conjunction with the accompanying drawings which illustrate the invention.

In the drawings:

FIG. 3 is a vertical sectional view through a portion of a ball valve slightly modified with respect to the structure shown in FIG. 1.

FIG. 4 is another view similar to FIG. 3 of another embodiment of this invention.

FIG. 5 is a vertical sectional view of a valve body and valve ball illustrating the installation of the ball.

Figure 1:
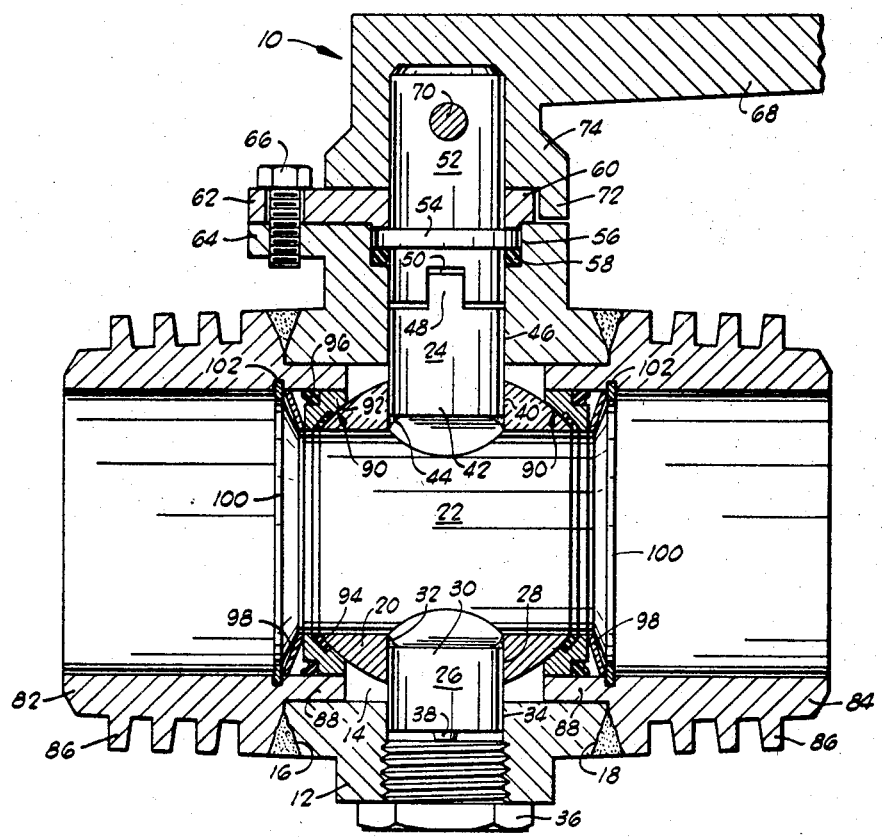
FIG. 1 is a vertical sectional view through a ball valve constructed in accordance with this invention.

Referring to the drawings in detail, and particularly FIG. 1, reference character 10 generally designates a complete ball valve construction which includes a tubular valve body 12 having a valve chamber 14 therein and upstream and downstream ends 16 and 18, respectively. A valve ball 20, having the usual flow port 22 therethrough, is mounted in the valve chamber 14 on upper and lower trunnions 24 and 26. The lower trunnion 26 extends into a bore 28 formed through the bottom of the ball 20 in communication with the flow port 22 and has its upper or inner end 30 welded to the walls of the bore 28 by suitable welding material 32. It may also be noted at this point that the welding 32 is performed or applied from the flow port 22 when the ball 20 and trunnion 26 are in the positions illustrated in FIG. 1. The lower end portion of the lower trunnion 26 is journaled in a portion of a bore 34 extending through the bottom wall of the valve body 12. A plug 36 is threadedly secured in the lower end of the bore 34, and the upper end of the plug 36 provides a thrust bearing support for a projection 38 formed on the lower end of the lower trunnion 26.

The upper trunnion 24 extends into a bore 40 formed through the top of the ball 20 in communication with the flow port 22, and the lower end 42 of the trunnion 24 is welded to the walls of the bore 40 by welding material 44. Thus, the upper trunnion 24 is also rigidly secured to the ball 20. Here again, it may be noted that the welding 44 is applied from the flow port 22 when the trunnion 24 and ball 20 are in the positions illustrated in FIG. 1. The upper trunnion 24 extends upwardly from the ball 20 and is journaled in a bore 46 extending vertically through the top wall of the valve body 12 in vertical alignment with the bore 34 in the bottom of the body. The upper end of the upper trunnion 24 is provided with a key 48 sized to be received in a slot 50 formed in the lower end of a valve stem 52.

The lower end portion of the valve stem 52 is journaled in the bore 46, and a circumferential, external flange 54 formed around the stem 52 immediately above the slot 50 is rotatably received in a counterbore 56 formed in the valve body 12 at the upper end of the bore 46. A suitable seal, such as an O-ring 58, is preferably provided in the counterbore 56 around the valve stem 52 and below the flange 54 to prevent the escape of fluid from the valve chamber 14 around the upper trunnion 24 and valve stem 52.

Figure 2:
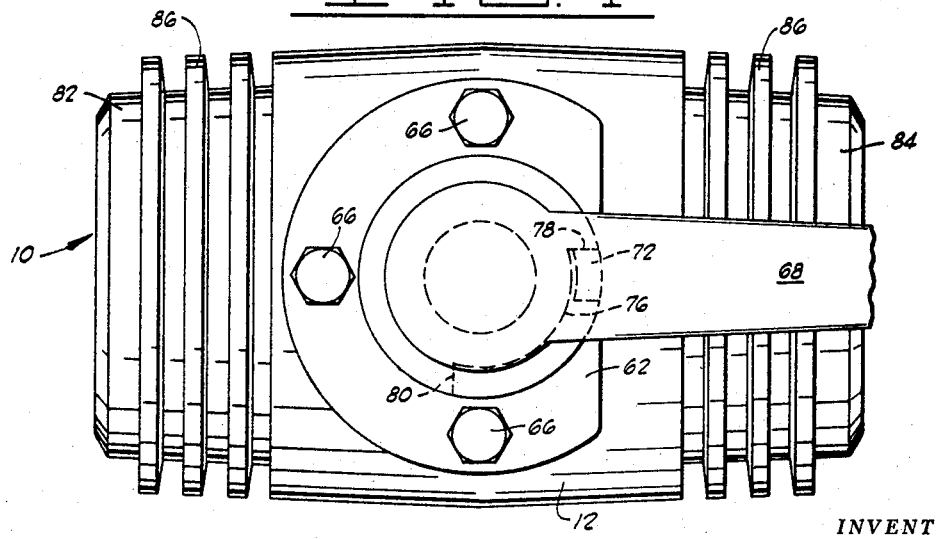
FIG. 2 is a plan view of the valve shown in FIG. 1.

A retainer 60 is positioned on top of the valve body 12 and has an aperture therethrough loosely receiving the valve stem 52. A flange 62 extends radially outward from a substantial portion of the circumference of the retainer 60, as shown in FIG. 2, and a cooperating flange 64 is provided on the upper end of the valve body 12. The flanges 62 and 64 are provided with mating bolt holes to receive bolts or screws 66, whereby the retainer 60 will be firmly secured on the top of the valve body 12 against the flange 54 of the valve stem 52 and prevent removal of the valve stem or the seal 58 during operation of the valve.

A handle 68 is rigidly secured on the upper end of the valve stem 52, as by a pin 70, above the retainer 60 to turn the valve ball between its open and closed positions. A projection 72 on the lower end of a hub portion 74 of the handle 68 extends into a slot 76 (FIG. 2) formed around about one-fourth of the circumference of the retainer 60. The opposite ends 78 and 80 of the slot 76 thus form stops for the projection 72 of the handle 68 and limit the turning movements of the ball 20 to approximately 90 degrees. It may also be noted at this point that since the ball 20 is rigidly secured to the upper trunnion 24 and the upper trunnion 24 is firmly connected to the handle 68 through the valve stem 52, the ball 20 will be positively moved to the desired open or closed positions when the projection 72 on the handle engages the respective ends of the slot 76, such that the valve ball 20 is accurately indexed to its open and closed positions.

A tubular connector 82 is welded to the upstream end 16 of the valve body 12, and a tubular connector 84 is welded to the downstream end 18 of the body. Both of the connectors are formed with radial fitns 86 extending circumferentially around the respective connector, and the outer end of each connector is preferably shaped for welding of the connectors in a piping system (not shown). Each of the connectors 82 and 84 is also provided with an axially extending tubular flange 88 on the inner end thereof sized to slidingly fit in the respective end of the valve chamber 14 and align the connectors with the valve body during the welding of the connectors to the body. A valve seat 90 is positioned in each of the axial flange portions 88 to mate with the valve ball 20 and control the flow of fluid through the valve in the usual manner. Each valve seat 90 includes a reinforcing ring 92 sized to slidingly fit in the respective connector flange portion 88; a resilient seal portion 94 positioned to co-operate with the ball 20, and an outer seal portion 96 positioned to cooperate with the walls of the respective axial flange 88. It will be apparent that the face of the reinforcing ring 92 adjacent the ball 20, and the seal portion 94, are shaped to sealingly mate with the ball 20. Also, the outer seal 96 is provided to sealingly engage the flange 88 and prevent the flow of fluid around the respective seat 90. A suitable spring 98 engages the outer end of each seat 90 and is held in position by a locking ring 100 mounted in a mating groove 102 formed in the inner periphery of the respective connector 82 or 84.

As previously indicated, the valve ball 20 is installed in the body 12 prior to the welding of the connectors 82 and 84 to the opposite ends of the body. In installing the ball 20, the ball is first inserted in the body 12 into the position illustrated in FIG. 1. Each of the trunnions 24 and 26 is then inserted through its respective body bore 46 or 34 to the desired distance into the ball 20. The inner ends 42 and 30 of the trunnions 24 and 26 are then accessible through the flow port 22 of the ball for the application of the welding material 44 and 32 for rigidly securing the ball to the trunnions. The plug 36 may then be threaded into the lower end of the body bore 34 and the valve stem 52, sealing ring 58, retainer 60 and handle 68 are then (or later) installed as illustrated in FIG. 1.

When the connectors 82 and 84 are welded to the opposite ends 16 and 18 of the body 12 as shown in FIG. 1, the valve seats 90 are then inserted through the respective connectors into engagement with the opposite sides of the valve ball 20. Each valve seat 90 is then effectively secured in position by insertion of the respective springs 98 and locking rings 100. Thus, the heat developed by the welding of the connectors 82 and 84 to the valve body can not possibly damage the valve seats 90. Further, the sealing ring 58 may be installed after the welding of the connectors 82 and 84 to prevent any possible damage thereto during the welding operation. Finally, it will be noted that the only conduction of heat to the valve ball 20 during the welding of the connectors 82 and 84 is through the walls of the valve body 12 and the trunnions 24 and 26, and the amount of heat transferred to the ball 20 will not be sufficient to distort the ball 20 or foul the journaling connection of the trunnions 24 and 26 in the valve body.

When the outer ends of the connectors 82 and 84 are subsequently welded to adjacent sections of a piping system, the heat generated by such welding operations will be substantially dissipated by the heat radiating fins 86, such that a minimum amount of heat will reach the valve seats 90 and the valve seats will not be damaged.

The valve 10 operates in a conventional manner. When the valve is in an open position as shown in FIG. 1, the fluid flows freely through the connector 82, the flow port 22 of the ball 20 and through the connector 84. In this position of the ball 20, the inner seals 94 of the seats 90 remain in sealing engagement with the outer surface of the ball 20, and the outer seals 96 remain in sealing engagement with the walls of the respective axial flange portions 88 to minimize the leakage of fluid into the valve chamber 14 between the seats 90. Such fluid as does gain access to the valve chamber 14 between the seats 90 is prevented from leaking from the valve body by the plug 36 and by the sealing ring 58 encircling the valve stem 52.

To close the valve 10, the handle 68 is turned 90 degrees to move the projection 72 through the slot 76 into a position against the shoulder 80 of the retainer 60. The ball 20 will thereby be turned 90 degrees from the position shown in FIG. 1 where the flow port 22 is out of communication with the connectors 82 and 84. In this closed position of the valve, the upstream fluid pressure in the connector 82 will act against the outer face of the upstream seat 90 and retain the inner seal 94 of this seat tightly in engagement with the outer surface of the ball 20. At the the same time, the outer seal 96 of the upstream seat 90 will be retained in sealing engagement with the inner periphery of the respective axial flange portion 88 to prevent leakage of fluid around the respective valve seat.

It should also be pointed out that the valve 10 may be secured in a piping system in either direction. That is, either the connector 82 may be upstream as previously described, or the connector 84 may be upstream, and the valve will operate in the same manner.

Embodiment of FIG. 3

The valve 10a partially illustrated in FIG. 3 is of the same construction as the valve 10 previously described, except for the construction of the trunnions and their mating bores in the valve ball and the manner in which the lower trunnion is secured in the valve body.

In the valve 10a, the bore 28a in the bottom of the ball 20a is provided with a counterbore 104 at the lower end thereof which is preferably tapered to a larger diameter toward the outer periphery of the ball. The lower trunnion 26a is similarly shaped in that the upper end portion 30a of the trunnion is of reduced diameter to rotatably fit in the main portion of the body bore 28a. Thus, when the welding material 32a is applied to secure the inner end of the lower trunnion 26a to the walls of the bore 28a, the resulting contraction of the parts upon cooling pulls the shoulder 106 on the lower trunnion more tightly into engagement with the walls of the counterbore 104 to increase the rigidity of the connection of the lower trunnion 26a to the ball 20a.

Similarly, the upper bore 40a in the top of the valve ball 20a is provided with a counterbore 108 in the outer end thereof tapered to a larger diameter at the outer surface of the ball, and the inner end portion 42a of the upper trunnion 24a is of reduced diameter to provide a shoulder 110 shaped in the same manner as the counterbore 108. Thus, when the welding material 44a is applied to secure the inner end of the upper trunnion 24a to the walls of the bore 40a, the shoulder 110 of the trunnion will be pulled into tight engagement with the walls of the respective counterbore 108 and more firmly secure the upper trunnion 24a to the valve ball 20a.

In this embodiment of the invention, the projection 38a on the lower end of the lower trunnion 26a is in engagement with a plug 112 welded in the lower body bore 34, rather than being threadedly secured as in the previous embodiment. Thus, the plug 112 effectively seals the body bore 34 and provides a thrust bearing support for the projection 38a to maintain the valve ball 20a in the desired vertical position without interfering with the ease of turning of the ball.

Embodiment of FIGS. 4 and 5

The valve 10b partially illustrated in FIG. 4 also conforms in construction to the valve 10 previously described, except for the construction of the trunnions and cooperating material 44b, the resulting contraction of the parts on the lower trunnion.

In the valve 10b, the bore 40b extending through the top of the valve ball 20b is tapered to a smaller diameter toward the center of the valve ball, and the lower or inner end portion 42b of the upper trunnion 24b is similarly shaped. Thus, when the lower end of the upper trunnion 24b is welded to the walls of the bore 40b with the welding material 44, the resulting contraction of the parts on cooling will tend to wedge the lower end portion 42b against the correspondingly tapered walls of the bore 40b and increase the rigidity of the connection of the upper trunnion to the ball.

Similarly, the bore 28b extending through the bottom of the valve ball is tapered to a smaller diameter toward the center of the ball and the upper or inner end portion 30b of the lower trunnion 26b is similarly tapered, whereby the lower trunnion 26b will be more positively secured to the ball when the parts contract following the application of the welding material 32b.

Also in the valve 10b, the lower body bore 34b extends only partially through the bottom wall of the valve body 12b. Thus, the projection 38b on the lower end of the lower trunnion 26b engages the bottom 114 of the lower body bore 34b to support the valve ball 20b in the desired vertical position. Since the lower body bore 34b extends only partially through the bottom wall of the valve body 12b, the lower trunnion 26b must be installed in the valve body 12b prior to the installation of the valve ball 20b. However, this may be easily accomplished as illustrated in FIG. 5.

As shown in FIG. 5, the lower trunnion 26b is inserted in the lower body bore 34b, and the upper trunnion 24b is either not inserted in the upper body bore 46b at this time or is only partially inserted in the respective body bore so as not to project into the interior of the valve body 12b. The ball 20b is then rolled into the valve body with the lower bore 28b in the ball being moved over the upper end portion 30b of the lower trunnion. The movement of the lower bore 28b of the ball over the upper end portion 30b of the lower trunnion is possible by virtue of the tapered configuration of these parts. When the ball 20b is completely rolled into the body 12b with the upper end portion 30b of the lower trunnion fully inserted in the bore 28b of the ball, the upper trunnion 24b may then be fully inserted through the upper body bore 46b to place the lower or inner end portion 42b of the upper trunnion in the upper tapered bore 40b of the valve ball; whereupon the welding material 32b and 44b may be applied from the flow port 22b of the ball in the manner previously described.

Figure 6:
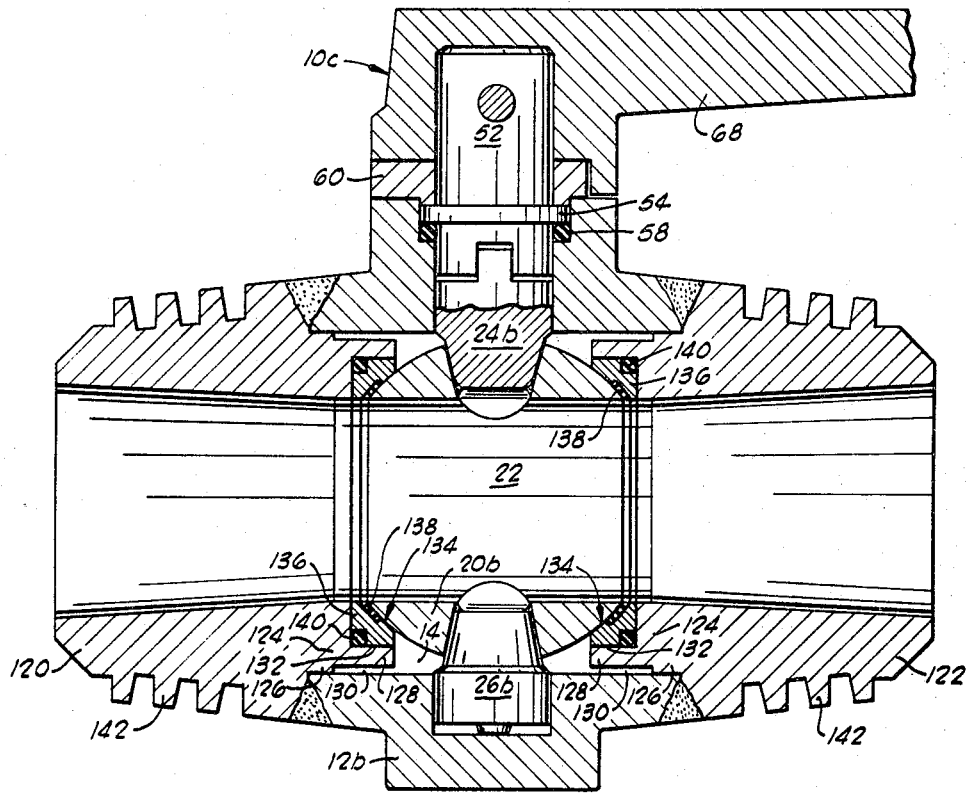
FIG. 6 is a vertical sectional view through another embodiment of ball valve incorporating the invention.

Embodiment of FIG. 6

The valve 10c shown in FIG. 6 incorporates the valve body 12b, ball 20b and trunnions 24b and 26b previously described in connection with FIG. 4, as well as the valve stem 52, retainer 60 and handle 68 previously described in connection with FIG. 1, so it will not be necessary to repeat such description at this point. The valve 10c is included to illustrate a valve construction wherein the valve seats are installed prior to the welding of the connectors to the opposite ends of the valve body, rather than being installed after such welding as in the previously described embodiments.

In the valve 10c, each of the connectors 120 and 122 has an axial flange portion 124 sized to extend into the respective end of the valve body 12b. The outer diameter of the portion 126 of each flange 124 adjacent the respective end of the valve body is sized to slidingly fit in the valve chamber 14 and maintain the respective connector in alignment with the valve body 12b during the welding of the respective connector to the valve body. The outer diameter of each flange 124 is then reduced to provide an inner end portion 128 spaced radially inwardly from the adjacent wall of the valve chamber 14 and provide an insulating space 130 surrounding the respective portion 128. Each end portion 128 of each axial flange 124 is provided with a counterbore 132 to slidingly receive a valve seat 134. Each valve seat comprises a reinforcing ring 136 containing an inner seal 138 and an outer seal 140. The inner seal 138 of each valve seat is shaped to mate with the outer surface of the ball 20b, and the outer seal 140 is sized to sealingly engage the walls of the counterbore 132 and prevent the leakage of fluid around the outer periphery of the respective seat.

As will be apparent from an examination of FIG. 6, the seats 134 must be installed prior to the time the axial flange portion 124 of the connectors 120 and 122 are inserted in the valve chamber 14, and thus prior to the time the connectors are welded to the valve body 12b. However, the insulating spaces 130 around the inner end portions 128 of the axial flanges 124 minimize the transfer of heat from the welding operations to the seats 134 to minimize the possibility of damage or distortion of the seats. Further, a cooling fluid may be circulated through the connectors 120 and 122 and through the flow port 22 of the valve ball 20b during the welding of the connectors to the valve body 12b to facilitate the dissipation of heat generated by the welding operations and further minimize the possibility of damage to the valve seats 134.

Each connector 120 and 122 is also provided with a series of radially extending heat radiating fins 142 on the outer periphery thereof to facilitate the dissipation of heat generated when the outer ends of the connectors are welded to adjacent sections of a piping system, such that an undue amount of heat will not reach the valve seats 134 during the installation of the complete valve in a piping system.

Figure 7:
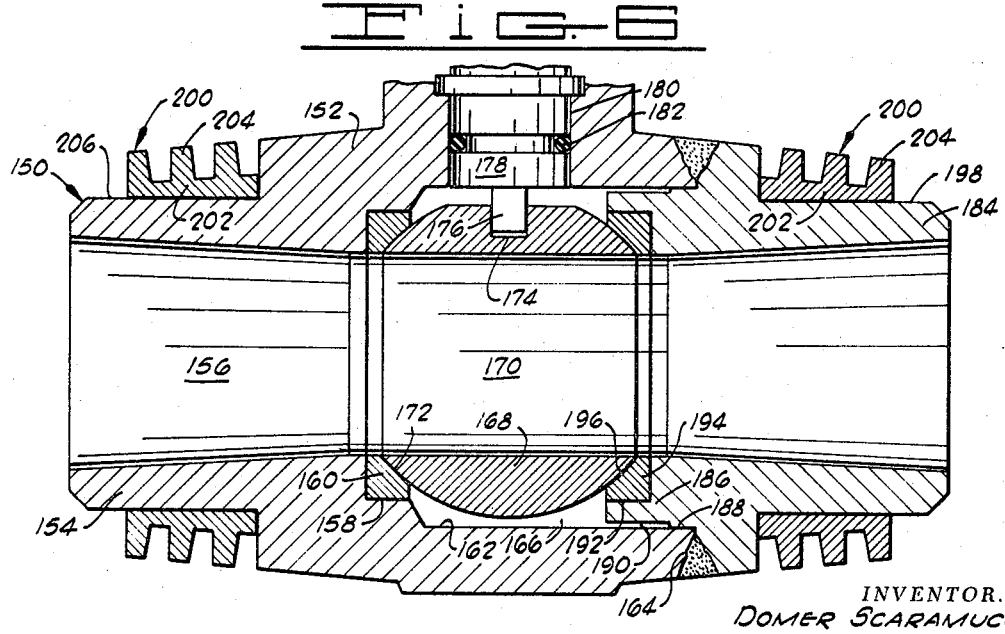
FIG. 7 is a partial vertical sectional view through still another embodiment of the invention.

Embodiment of FIG. 7

The valve 150 shown in FIG. 7, comprises a valve body 152 having an extension 154 on one end thereof forming a connector for the respective end of the valve. A bore 156 extends through the connector portion 154 of the valve body to form either the inlet or the outlet to the valve. A first counterbore 158 is formed in the valve body 152 concentrically around the bore 156 to tightly receive a suitable valve seat 160. A second counterbore 162 is provided in the valve body 152 from the first counterbore 158 to the opposite end 164 of the valve body to form the valve chamber 166.

A valve ball 168, having the usual flow port 170 therethrough, is positioned in the valve chamber 166 in sealing engagement with the valve seat 160. It may here be noted that a seating surface 172 is provided on the seat 160 shaped to conform with the outer surface of the ball 168 in the usual manner of a ball valve seat. A rectangular slot 174 is formed in the top of the ball 168 extending at right angles to the flow port 170 through the ball. The slot 174 slidingly receives a rectangular projection 176 on the lower end of a suitable valve stem 178. The valve stem 178 is journaled in a vertical bore 180 extending through the top wall of the valve body 152 and is preferably sealed therein by an O-ring or the like 182 to prevent the leakage of fluid from the valve chamber 166 around the valve stem. The valve stem 178 is also provided with the usual handle and indexing mechanism (not shown) for turning the valve ball 168 through the medium of the projection 176 and slot 174 in the usual fashion.

A separate tubular connector 184 is welded to the end 164 of the valve body 152. The connector 184 has an axial flange portion 186 extending into the respective end of the valve chamber 166. The portion 188 of the axial flange 186 adjacent the outer end 164 of the valve body has an outer diameter substantially corresponding to the diameter of the valve chamber 166 to maintain the connector 184 in alignment with the valve body during the welding of the connector to the valve body. The flange portion 186 is reduced in outer diameter adjacent the portion 188 to provide an insulating space 190 between the wall of the valve chamber 166 and the adjacent portion of the flange 186. The flange 186 is also provided with a counterbore 192 to receive a suitable valve seat 194. It will be readily understood that the valve seat 194 is provided with a seating face 196 mating with the outer surface of the ball 168 in a manner similar to the opposite valve seat 160.

It will be apparent that not only the valve seat 160, but also the valve seat 194 must be installed in the valve 150 prior to the welding of the connector 184 to the valve body. However, the insulating space 190 minimizes the transfer of heat to the seat 194 during such welding operation to minimize the possibility of damage to the seat. Further, a cooling fluid may be circulated through the valve during this welding operation to further minimize the possibility of a transfer of an excessive amount of heat to the valve seat 194. The connector 184 has a reduced outer diameter portion 198 closely receiving a heat radiating fin unit 200. The unit 200 is preferably formed of a material which will readily conduct heat, such as aluminum, and comprises a tubular body portion 202 and a series of outwardly extending circumferential fins 204. The inner diameter of the body portion 202 may be sized such that the unit 200 is easily press-fitted on the connector 184 to provide a good transfer of heat from the connector 184 to the heat radiating unit 200.

Another heat radiating unit 200 is preferably press-fitted on a reduced outer diameter portion 206 of the connector portion 154 of the valve body 152.

When the valve 150 is welded into a piping system, the heat generated by such welding operations is appreciably dissipated through the heat radiating units 200 to minimize the transfer of heat through the valve body 152 to the seat 160 and through the connector 184 to the seat 194. Thus, neither of the valve seats will be damaged during the installation of the valve in a piping system.

The valve 150 operates in the same manner as the valves previously described to control the flow of fluid through the valve by turning the valve ball 168 to its opened and closed positions. In this embodiment, however, the valve ball 168 is free to move downstream when in a closed position, except for the restraint imposed on the valve by the downstream seat, since the slot 174 and extension 176 of the valve stem 178 will be aligned with the axis through the valve when the ball 168 is turned to a closed position.

It should also be pointed out that the valve 150 may be used in either direction in a piping system, such that either the seat 160 or the seat 194 may be the downstream seat.

From the foregoing, it will be apparent that the present invention provides a novel ball valve construction wherein the valve ball is easily and positively secured to trunnions to provide accurate indexing of the valve to open and closed positions. It will also be apparent that the present invention provides a welded ball valve construction wherein the valve parts, such as the valve seats, will not be damaged either by welding connectors on the opposite ends of the valve body or by welding the complete valve in a piping system.

The invention also provides a novel method of installing a valve ball in a valve when the valve ball is to be secured on trunnions to be maintained on a fixed vertical axis in the valve body.

Changes may be made in the combination and arrangement of parts or elements, as well as in steps or procedures, as heretofore set forth in the specification and shown in the drawings without departing from the spirit and scope of the invention as defined in the following claims.

What is claimed is:

1. In a ball valve for a piping system, the combination of:
   a body having a valve chamber therein;
   a valve ball in the valve chamber having a flow port therethrough, said valve ball also having a bore through the top thereof communicating with the flow port and a bore through the bottom thereof in alignment with the upper bore and communicating with the flow port;
   an upper trunnion journaled in the body and extending into the upper bore in the valve ball;
   a lower trunnion journaled in the body and extending into the lower bore in the valve ball; and
   welding material in each of said bores exposed to the flow port rigidly securing the respective trunnion to the walls of the respective bore.

2. A ball valve as defined in claim 1 wherein each of said bores has a counterbore in the outer end thereof and the respective trunnion is correspondingly varied in diameter to enhance the rigidity of the connections of the trunnions to the valve ball.

3. A valve ball as defined in claim 1 wherein each of said bores is tapered to a smaller diameter toward the center of the valve ball and the respective trunnion is correspondingly tapered to facilitate the installation of the valve ball in the body and enhance the rigidity of the connection of the valve ball to the trunnions.

4. A valve ball as defined in claim 1 characterized further to include:
   a valve operating stem detachably secured to the upper trunnion and journaled in a mating bore in the body, said stem having a circumferential flange thereon positioned in said mating bore;
   a retainer secured to the body around said stem in engagement with said flange to retain the stem in assembly in the body; and
   an operating handle secured to said stem above said retainer and cooperating with said retainer to control the open and closed positions of the valve ball.

5. A ball valve as defined in claim 1 wherein the lower trunnion extends partially into a vertically extending bore formed through the respective wall of the valve body and has a reduced diameter projection on the lower end thereof, and characterized further to include:
   a plug sealingly secured in the lower end of said vertically extending bore forming a bearing support for said reduced diameter projection.

6. A ball valve as defined in claim 5 wherein said plug is welded to the valve body.

7. A ball valve as defined in claim 5 wherein said plug is threadedly secured to the valve body.

8. A ball valve as defined in claim 1 characterized further to include:
   tubular connectors welded to the opposite ends of the valve body forming inlet and outlet connectors for the valve, each of said connectors having a tubular, axial flange extending into the respective end of the valve body in telescoping relation over the respective side of the valve ball;
   a seat slidingly supported in each of said axial flanges having a surface thereon shaped to mate with the valve ball;
   spring means anchored in each of said connectors urging the respective seat against the valve ball; and
   each of said seats and spring means being sized for insertion through the respective connector into operating position after the connectors are welded to the valve body.

9. A valve ball as defined in claim 1 characterized further to include:
   tubular connectors welded to the opposite ends of the valve body forming welding type inlet and outlet connectors for the valve;
   each of said tubular connectors having radially extending heat transfer fins thereon to minimize the transfer of heat toward the valve body when the valve is welded into the piping system.

10. A ball valve construction to be welded into a piping system, comprising:
    a tubular valve body having upstream and downstream ends;
    a valve ball supported in the body for rotary movement;
    a seat supported on each of the upstream and downstream sides of the ball and sealingly cooperating with the ball to control the flow of fluid through the valve; and
    a tubular connector welded to each of the upstream and downstream ends of the body adapted to, in turn, be welded to the piping system, each of said tubular connectors having radially extending heat transfer fins thereon to minimize the transfer of heat to said seats when the connectors are welded into a piping system.

11. A ball valve construction as defined in claim 10 wherein said heat transfer fins are formed integrally around said tubular connectors.

12. A ball valve construction as defined in claim 10 wherein said heat transfer fins are separate from said tubular connectors and pressed on said tubular connectors.

13. A ball valve construction as defined in claim 10 wherein each of said tubular connectors has an axially extending, tubular flange on the end thereof associated with the valve body extending into the respective valve seat, each of said axial flanges having an outer diameter less than the inner diameter of the respective portion of the valve body to provide an insulating space between the body wall and the respective seat.

14. A ball valve construction as defined in claim 10 wherein said valve ball has bores in the top and bottom thereof, and characterized further to include:
    trunnions journaled in the valve body extending into the bores in the top and bottom of the valve ball supporting the valve ball on a fixed vertical axis, said trunnions being welded to the valve ball.

15. A ball valve construction to be welded into a piping system, comprising:
    a tubular valve body having upstream and downstream ends and a valve chamber therein between said ends;
    a valve ball supported in the valve chamber;
    a tubular connector welded to one end of the valve body, said connector having a tubular, axial flange portion extending into the respective end of the valve chamber having an outer diameter less than the inner diameter of the valve chamber to provide an insulating space between said flange portion and the adjacent wall of the body, said connector also having heat radiating fins on the exterior thereof; and
    a valve seat carried in said flange portion sealingly engaging the valve ball.

16. A ball valve constructed as defined in claim 15 wherein said heat radiating fins are formed integrally with the connector.

17. A ball valve constructed as defined in claim 15 wherein said heat radiating fins are secured around the outer periphery of said connector.

18. A ball valve constructed as defined in claim 15 wherein said ball is supported for movement axially along the valve chamber.

19. In a method of mounting a valve ball having a flow port therethrough in the valve chamber of a valve body, the steps of:
    forming bores through the top and bottom of the valve ball communicating with the flow port through the valve ball;
    journaling trunnions in vertical alignment in the valve body projecting into the valve chamber;
    positioning the valve ball in the valve chamber with the trunnions extending partially into the bores in the top and bottom of the valve ball; and
    welding each trunnion to the walls of the respective bore in the valve ball from the flow port extending through the valve ball.

20. In a method of mounting a valve ball having a flow port therethrough in the valve chamber of a valve body, the steps of:
    forming bores through the top and bottom of the valve ball communicating with the flow port through the valve ball and tapered to a smaller diameter toward the center of the valve ball;
    supporting a first trunnion in the valve body at the bottom center of the valve chamber projecting into the valve chamber;
    shaping the upper end portion of the first trunnion to conform to the contour of the lower bore in the valve ball;
    rolling the valve ball into the valve chamber with the lower bore in the valve ball mating with the first trunnion in the bottom of the valve chamber;
    shaping one end portion of a second trunnion to the same contour as the upper bore in the valve ball;
    inserting the second trunnion through the top wall of the valve body into the upper bore in the valve ball; and
    welding the inner ends of said trunnions to the walls of the respective bores in the valve ball from the flow port extending through the valve ball.

References Cited

UNITED STATES PATENTS

| | | | |
|---|---|---|---|
| 1,662,263 | 3/1928 | Harris | 137—338 |
| 3,241,808 | 3/1966 | Allen | 251—315 X |
| 3,334,862 | 8/1967 | Hookway | 251—317 X |

M. CARY NELSON, *Primary Examiner.*

M. O. STURM, *Assistant Examiner.*

UNITED STATES PATENT OFFICE
CERTIFICATE OF CORRECTION

Patent No. 3,411,746                                                              November 19, 1968

Domer Scaramucci

It is certified that error appears in the above identified patent and that said Letters Patent are hereby corrected as shown below:

Column 3, line 36, "fitns" should read -- fins --. Column 5, lines 32 and 33, "ing material 44b, the resulting contraction of the parts on the lower trunnion." should read -- ing parts of the valve ball and the support provided for the lower trunnion. --; line 40, "44" should read -- 44b --. Column 6, line 44, "portion" should read -- portions --.

Signed and sealed this 24th day of March 1970.

(SEAL)
Attest:

Edward M. Fletcher, Jr.                                    WILLIAM E. SCHUYLER, JR.
Attesting Officer                                                Commissioner of Patents